Sept. 14, 1943.  F. A. RAMSDELL  2,329,294
APPARATUS FOR PROJECTING STEREO PICTURES
Filed April 12, 1941
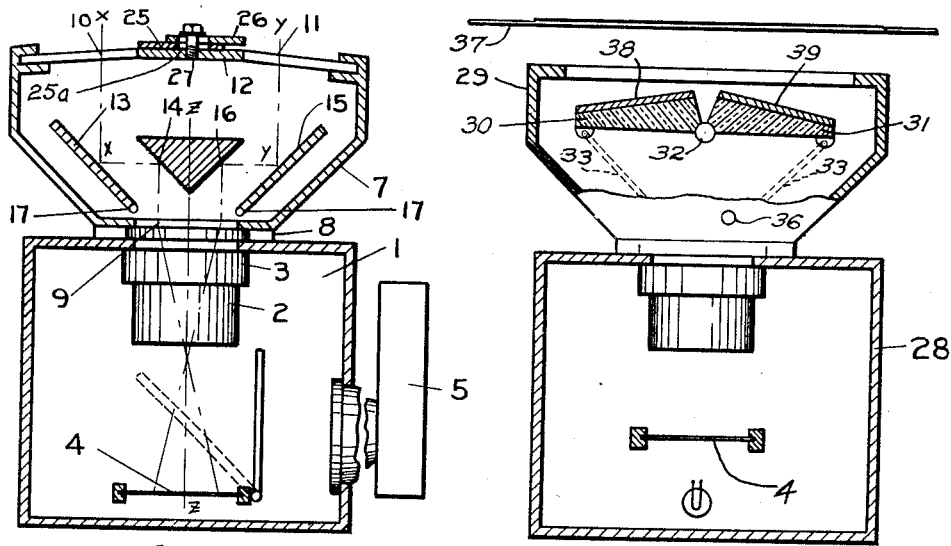
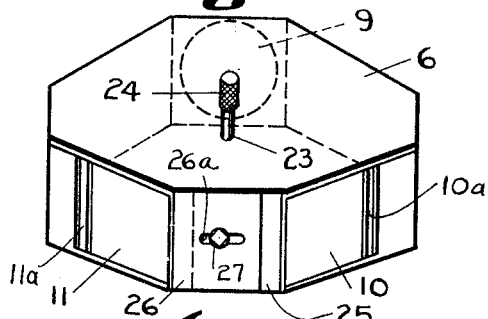
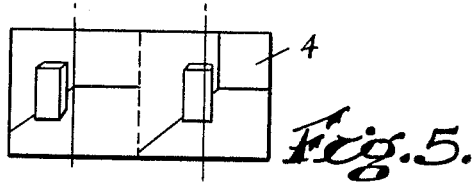
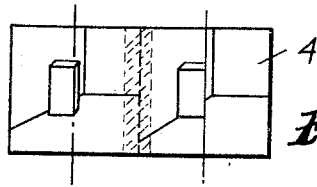
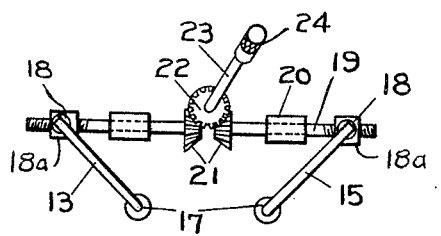
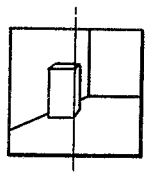
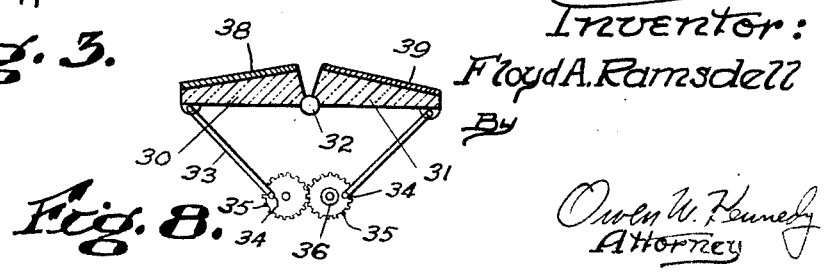

Patented Sept. 14, 1943

2,329,294

UNITED STATES PATENT OFFICE 2,329,294

APPARATUS FOR PROJECTING STEREO PICTURES

Floyd A. Ramsdell, Worcester, Mass., assignor to Worcester Film Corporation, Worcester, Mass., a corporation of Massachusetts Application April 12, 1941, Serial No. 388,240

3 Claims. (Cl. 88—16.6)

The present invention relates to stereo photography, and has for its object to provide improved apparatus for projecting pictures which create, upon observation, a three-dimensional or stereoscopic effect.

Briefly stated, the invention resides in an improved attachment for use in connection with a single lens projector of ordinary construction, to project previously taken stereoscopically related film images in overlying relation on a screen, to create a three-dimensional effect when observed.

The above and other advantageous features of the invention will hereinafter more fully appear from the following description considered in connection with the accompanying drawing, in which:

Fig. 1 is a diagrammatic view of an attachment embodying the general principle of the invention as applied to a camera.

Fig. 2 is a perspective view of the attachment shown in Fig. 1, removed from the camera.

Fig. 3 is a fragmentary view, illustrating means for adjusting the device of Fig. 1.

Fig. 4 is a diagrammatic view, illustrating an attachment embodying the invention mounted on a projector.

Figs. 5 and 6 illustrate the appearance of film images produced by the functioning of the attachment as shown in Fig. 1.

Fig. 7 illustrates the appearance of the film images of Fig. 6, as projected by the attachment when utilized as shown in Fig. 4.

Fig. 8 illustrates details of the means for adjusting the setting of the optical system of the attachment shown in Fig. 4.

Referring first to Fig. 1, the invention is shown for purposes of illustration as being applied to the projection of film images made by a camera 1 of usual construction, only the essential parts of which are shown. The camera 1 provides an objective lens 2 carried by a mounting 3, capable of axial adjustment for purposes of focusing, with reference to a film 4. A suitable finder 5 is adapted to reflect the scene being photographed through the lens, when the shutter cuts off the film, and a stereo attachment 6 embodying the general principles of the present invention is mounted directly on the camera 1 so as to cover the end of the lens mounting. As best shown in Fig. 1, the stereo attachment 6 comprises a casing 7 providing a bracket 8, by means of which the entire attachment can be mounted on the camera 1, the rear wall of the casing 7 providing an opening 9, which fits closely around the lens mounting 3.

The front of the casing 7 provides spaced openings or windows 10 and 11 separated by a solid shield 12, with the central axes x—x and y—y of the openings 10 and 11 displaced a distance substantially equal to the mean spacing of the human eyes from each other, commonly known as the interocular distance. The interior of the casing 7 provides pairs of spaced reflectors 13, 14 and 15, 16 respectively, which are symmetrically arranged with reference to an axis z—z coinciding with the center of the opening 9 and the optical axis of the objective lens 2.

As shown in Fig. 1, the several reflectors 13, 14 and 15, 16 are so disposed with reference to the axis z—z, that rays of light entering the openings 10 and 11 along the axes x—x and y—y will be reflected as shown by the dot and dash lines, and so enter the lens 2 in substantially parallel relation. Furthermore, these rays will strike the film 4 at equal distances from the axis z—z, although the rays cross in passing through the lens. Consequently, a pair of images will be produced on the film 4, as indicated in Fig. 5, which images will differ from each other to substantially the same degree as do the separate images recorded by the human eyes in viewing any object, first with one eye alone and then with the other, as a result of binocular vision, although said film images will be reversed.

As previously pointed out, the mounting 3 for the lens system is capable of axial adjustment for purposes of focusing, and the stereo attachment 6 is capable of adjustment independently of the camera, in order to provide for the proper centering of the side-by-side film images with reference to each half of the divided field. To this end, the reflectors 13 and 15 are mounted on pivots 17, so that each reflector 13 or 15 can be swung with respect to its associated fixed reflector 14 or 16 to vary the angle of incidence of the rays entering the openings 10 and 11, respectively. In order to swing the reflectors 13 and 15 in unison through the same angle, the free end of each reflector is slidable in a swivel 18 mounted on a block 18a receiving a screw shaft 19 rotatably mounted at 20, and provided at its opposite end with a worm wheel 21. The two shafts 19 are in axial alinement, and the worm wheels 21 engage a worm 22 on opposite sides of its axis. The worm 22 is mounted on a shaft 23 extending through the casing 7, and terminating in a knurled knob 24, by means of which the worm may readily be turned, as indicated in Fig. 2.

By turning the knob 24, the reflectors 13 and 15 can be swung in unison about their pivots 17, to slightly vary the angles of incidence of the rays entering the windows 10 and 11. Assuming an initial adjustment of the attachment such that the reflectors 13, 14 and 15, 16 are in substantial parallelism, and at an angle of 45° with respect to the axis z—z, a pair of film images will appear substantially as shown in Fig. 5, wherein main subjects on which the camera is focused are shown with relation to a background. While these film images may truly record what would be seen by an observer viewing the subject through first one eye and then the other, it is obvious that the subject on which the camera is focused may be recorded as undergoing too great a displacement with reference to the center lines of the two halves of the divided field, indicated by dot and dash lines.

However, by turning the knob 24 on the attachment, it is possible to swing the pivoted reflectors 13 and 15 in unison from the position of Fig. 1, to either increase or decrease the angles of incidence of the rays entering the windows 10 and 11, and thereby obtain film images substantially as shown in Fig. 6. As will be apparent from a comparison of the film images shown in Figs. 5 and 6, the net result of the adjustment of the reflectors 13 and 15 is to compensate for the shifting effect of binocular vision, to the extent of showing the main subject of each image substantially centered with reference to its field.

The above described adjustment of the attachment 6 is adapted to be performed after the attachment has been mounted on the camera, it being more or less immaterial as to what relation may exist between the reflectors when the attachment is placed in position in front of the camera lens. When the subject to be photographed is viewed through the finders of the camera, the operator will see the dual reflected images in side-by-side relation, and then by means of the adjustment described above, will be able to properly center the images in each half of the divided field that is being viewed. Thus, if the images appear on the finder substantially in the relation shown in Fig. 5, i. e., with the main subject off center, the images can be quickly brought into proper relation by turning the knob 24 on the attachment in one direction or the other, as may be required. The operator can quickly determine which way the knob should be turned by observing the images in the finder, and the adjustment can be readily made, so that the images appear substantially as shown in Fig. 6, wherein each image is centered in its half of the divided field.

The above described adjustment of the attachment is of very great advantage when taking successive shots of the same subject at different distances. Obviously, the required adjustment of the attachment can be made as soon as the subject has been focused upon for a given exposure, or series of exposures as with moving pictures, so that it is possible to definitely center the stereoscopically related images before an exposure is made.

As previously pointed out, the attachment also provides means for properly framing images of the subject being photographed with reference to each half of the divided field. As best shown in Figs. 1 and 2, the central shield 12 between the windows 10 and 11, provides plates 25 and 26, adjustably mounted with respect to the windows by means of a stud 27 threaded into the shield and passing through plate slots 25a and 26a. By means of this adjustable mounting, the plates 25 and 26 may be shifted with respect to the windows 10 and 11, so as to partially block off light rays entering the windows, for the purpose of properly framing the images that are to be recorded on the film.

Normally, the plates 25 and 26 are so mounted that their outside edges substantially coincide with the inner edges of the windows 10 and 11, as defined by the shield 12. However, should it be desired to frame the subject more closely than as shown in Fig. 6, the plates 25 and 26 may be shifted so as to extend beyond the edges of the shield 12, which has the effect of blocking off a portion of the light from the middle of the divided field, as indicated by the dotted line cross-hatching in Fig. 6.

Referring now to Figs. 4 and 8, there is shown an attachment embodying the present invention, as utilized for the projection on a screen, by a projector 28 of ordinary construction, of the film images previously produced. In this projection attachment, indicated by the reference character 29, the pairs of relatively adjustable reflectors 13, 14 and 15, 16 of Fig. 1 are replaced by optical wedges 30 and 31, mounted for adjustment within the attachment about a common pivot 32. The free ends of the wedges 30 and 31 are pivotally connected by links 33 to crank pins 34 adapted to be turned in unison through intermeshing gears 35 by means of a knob 36 extending from the shaft of one gear 35. The knob 36 is shown as extending above the top of the attachment 29 in Fig. 4 and obviously turning the knob 36 will vary the angular relation between the wedges 30 and 31.

When a film 4, or slide, having double images of the character shown in Fig. 6 is run through the projector 28, double images will be thrown on the screen 37, indicated diagrammatically, since the distance between the projector 28 and screen 37 is indeterminate. By manipulation of the knob 36, while observing the projected screen images, the optical wedges 30 and 31 can be readily adjusted to the proper angle with relation to the projecting lens, so as to cause the screen images to appear in substantially registering relation, as shown in Fig. 7.

In order that the projected film images of Fig. 7 may be viewed so as to obtain a maximum stereoscopic effect without blur, the wedges 30 and 31 provide polarizers in the form of sheets of light polarizing material, shown at 38 and 39. The polarizer 38 is adapted to polarize light in one axis, while the polarizer 39 is adapted to polarize light in an axis at 90° to the axis of the polarizer 38, as indicated by the cross-hatching. Consequently, should the projected film images of Fig. 7 be viewed through glasses having polarizers effective in axes at right angles, as regards the two eyes of the observer, and in inverse relation to the polarizers 38 and 39, a true stereoscopic effect will be obtained. That is to say, when the projected images of Fig. 7 are viewed through polarizing glasses, the observer's right eye will see only what is projected from the left half of the divided field of Fig. 6, while the left eye will see only what is projected from the right half. The net result is the same as if the subject were being seen directly with true binocular vision, with the observer being fully aware of the three-dimensional character of the subject, without blurring of the images.

From the foregoing, it is apparent that by the present invention there is provided an improved attachments for use in connection with single lens projectors, to project stereoscopically related film images in proper relation on a screen, to create a three-dimensional effect when observed.

I claim:

1. Apparatus for projecting stereo pictures, comprising an attachment adapted to be mounted in front of the objective lens of a projector, said attachment comprising a pair of optical wedges for simultaneously projecting stereoscopically related images existing in side-by-side relation on a film or slide in the projector, and means for angularly adjusting said wedges about a common pivotal axis, to project said images in overlying relation on a screen to create a three-dimensional effect when observed, in cooperation with light polarizers mounted on said wedges and as utilized by an observer.

2. Apparatus for projecting stereo pictures, comprising an attachment adapted to be mounted between the objective lens of a projector and a screen, said attachment comprising a pair of optical wedges extending in opposite directions and mounted to swing about a common pivot intersecting the axis of projection, for simultaneously projecting stereoscopically related images existing in side-by-side relation on a film or slide in the projector, and means for swinging said wedges in unison about their common pivotal axis and to the same degree, to cause the projection of said images in overlying relation on said screen, with the degree of such overlying relation as obtained through said adjustment, being such as to create a three-dimensional effect when observed, in cooperation with light-polarizers provided by said attachment, and as utilized by an observer.

3. Apparatus for projecting stereo pictures, comprising an attachment adapted to be mounted between the objective lens of a projector and a screen, said attachment comprising a pair of optical wedges extending in opposite directions and mounted to swing about a common pivot intersecting the axis of projection, for simultaneously projecting stereoscopically related images existing in side-by-side relation on a film or slide in the projector, and means for swinging said wedges in unison about their common pivotal axis and to the same degree, to cause the projection of said images in overlying relation on said screen, with said wedges each carrying a sheet of light-polarizing material, whereby to create a three-dimensional effect when said overlying projected images are observed in cooperation with light-polarizing means.

FLOYD A. RAMSDELL.